US 6,537,016 B2

(12) United States Patent
Bonsall

(10) Patent No.: US 6,537,016 B2
(45) Date of Patent: Mar. 25, 2003

(54) ANIMAL TRANSPORTING SYSTEM

(76) Inventor: Sandie W. Bonsall, 12349 - 118 Rd., Minneola, KS (US) 67865

( * ) Notice: Subject to any disclaimer, the term of this patent is extended or adjusted under 35 U.S.C. 154(b) by 0 days.

(21) Appl. No.: 09/925,253

(22) Filed: Aug. 8, 2001

(65) Prior Publication Data

US 2002/0061246 A1 May 23, 2002

Related U.S. Application Data

(63) Continuation-in-part of application No. 09/717,727, filed on Nov. 20, 2000.
(51) Int. Cl.[7] .............................. B60P 3/04; B60P 1/43
(52) U.S. Cl. .................... 414/537; 119/405; 119/412; 119/413; 119/843
(58) Field of Search ................... 119/843, 412, 119/413, 405, 400; 414/537

(56) References Cited

U.S. PATENT DOCUMENTS

| | | | | |
|---|---|---|---|---|
| 225,911 A | * | 3/1880 | Alston | 119/412 |
| 228,933 A | * | 6/1880 | Rieber | 119/412 |
| 282,706 A | * | 8/1883 | Dahlman et al. | 119/412 |
| 1,266,375 A | * | 5/1918 | Adams | 119/412 |
| 4,566,404 A | * | 1/1986 | Instone et al. | 119/412 X |
| 5,950,562 A | * | 9/1999 | Schulte et al. | 119/843 X |

* cited by examiner

Primary Examiner—Steven A. Bratlie

(57) ABSTRACT

An animal transporting system for efficiently loading, unloading, sorting, separating and transporting animals within an enclosed structure. The inventive device includes a frame attached to a truck, a ramp movably attached to the frame that is extendable from the frame, a plurality of holding pens within the frame defined by a plurality of partitions, and a plurality of doors pivotally attached to the partitions. Each of the doors are manipulated by an actuator such as a hydraulic cylinder. A stimulator system is positioned within each of the holding pens to humanely encourage an animal to exit the holding pen.

11 Claims, 16 Drawing Sheets

ANIMAL TRANSPORTING SYSTEM

CROSS-REFERENCE TO RELATED U.S. PATENT APPLICATION

I hereby claim benefit under Title 35, United States Code, Section 120 of U.S. patent application Ser. No. 09/717,727 filed Nov. 20, 2000. This application is a continuation-in-part of the Ser. No. 09/717,727 application. The Ser. No. 09/717,727 application is currently pending. The Ser. No. 09/717,727 is incorporated by reference into this patent application.

BACKGROUND OF THE INVENTION

1. Field of the Invention

The present invention relates generally to animal transporting devices and more specifically it relates to an animal transporting system that allows animals to be loaded and unloaded within a desired and efficient progression.

2. Description of the Prior Art

Animal transporting devices have been in use for years. Typically, an animal transporting device is comprised of a ground or dock level trailer that is connected to a vehicle. Conventional animal trailers have a rear door exposing an interior portion having one or more gates for creating various sizes of holding pens for the animals.

The most significant problem with conventional animal trailers is that they generally require more than one person to load, sort, transport, and unload animals from within. Another problem with conventional animal trailers is that animals incur significant amounts of stress during loading, sorting, and unloading.

While these devices may be suitable for the particular purpose to which they address, they are not as suitable for easily loading, unloading, sorting and transporting high stressed, weakened, sick, or recovering animals within an enclosed structure. Conventional animal trailers are not efficient to utilize when loading and unloading one or more animals.

In these respects, the animal transporting system according to the present invention substantially departs from the conventional concepts and designs of the prior art, and in so doing provides an apparatus primarily developed for the purpose of easily loading, unloading, sorting, and transporting animals within an enclosed structure.

SUMMARY OF THE INVENTION

In view of the foregoing disadvantages inherent in the known types of animal trailers now present in the prior art, the present invention provides a new animal transporting system construction wherein the same can be utilized for easily loading, unloading, sorting, and transporting animals within an enclosed structure with the operator removed or on the exterior of said structure.

The general purpose of the present invention, which will be described subsequently in greater detail, is to provide a new animal transporting system that has many of the advantages of the animal transporting devices mentioned heretofore and many novel features that result in a new animal transporting system which is not anticipated, rendered obvious, suggested, or even implied by any of the prior art animal transporting devices, either alone or in any combination thereof.

To attain this, the present invention generally comprises a frame attached to a truck, a ramp movably attached to the frame that is extendable from the frame, a plurality of holding pens within the frame defined by a plurality of partitions, and a plurality of doors pivotally attached to the partitions. Each of the doors are manipulated by an actuator such as a hydraulic cylinder. A stimulator system is positioned within each of the holding pens to humanely encourage an animal to exit the holding pen.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an animal transporting system that will overcome the shortcomings of the prior art devices.

A second object is to provide an animal transporting system for easily loading, unloading, sorting, and transporting animals within an enclosed structure.

An additional object is to provide an animal transporting system that allows only one individual to load, unload, sort and transport animals.

A further object is to provide an animal transporting system that encourages free and natural movement of animals.

Another object is to provide an animal transporting system that allows an individual to safely load, sort, separate, and unload animals.

A further object is to provide an animal transporting system that does not require an individual to enter the interior with the animals.

A further object is to provide an animal transporting system that simple in construction thereby creating a strong and durable structure.

A further object is to provide an animal transporting system that allows sick animals to be transported thereby reducing stress to the animal.

A further object is to provide an animal transporting system that reduces labor costs.

A further object is to provide an animal transporting system that will sort, deliver and return animals from hospital pens within a feedlot to their home pens.

A further object is to provide a low-stress, calm, humane way to transport sick and weakened animals with minimal interaction between animals and people.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and: attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
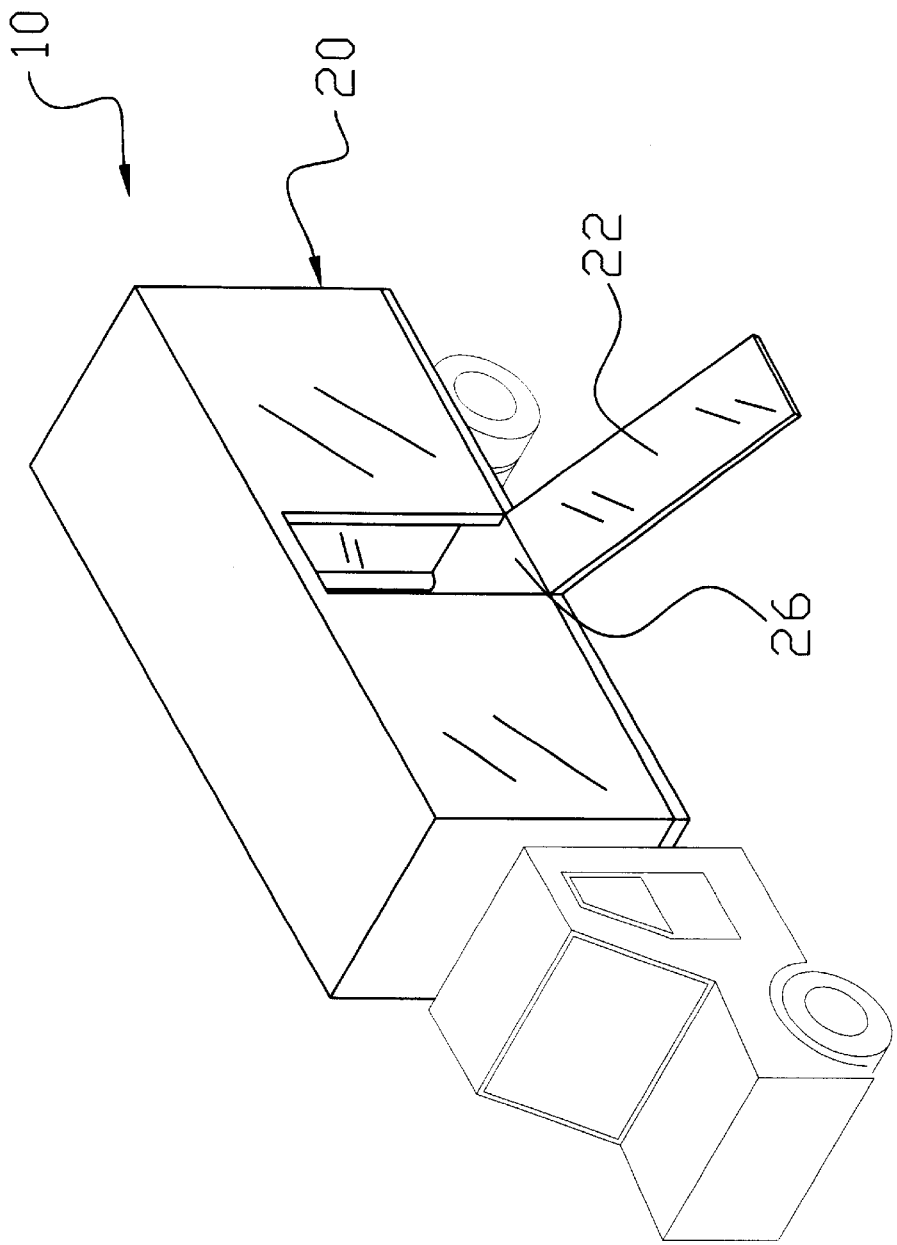
FIG. 1 is a front upper perspective view of the present invention.

Turning now descriptively to the drawings, in which similar reference characters denote similar elements throughout the several views, FIGS. 1 through 14 illustrate an animal transporting system 10, which comprises a frame 20 attached to a truck, a ramp 22 movably attached to the frame 20 that is extendable from the frame 20, a plurality of holding pens 24 within the frame 20 defined by a plurality of partitions 30, and a plurality of doors pivotally attached to the partitions 30. Each of the doors are manipulated by an actuator such as a hydraulic cylinder. A stimulator system is positioned within each of the holding pens 24 to humanely encourage an animal to exit the holding pen.

As shown in FIG. 1 of the drawings, a truck or similar vehicle is provided to support the frame 20. The truck may include various structures and designs as can be appreciated. The purpose of the truck is to provide a self-powered device for transporting the animals 12 contained within the structure of the frame 20. Further discussion of the truck will not be pursued because the variations to the truck are deemed readily apparent to one skilled in the art.

Figure 2:
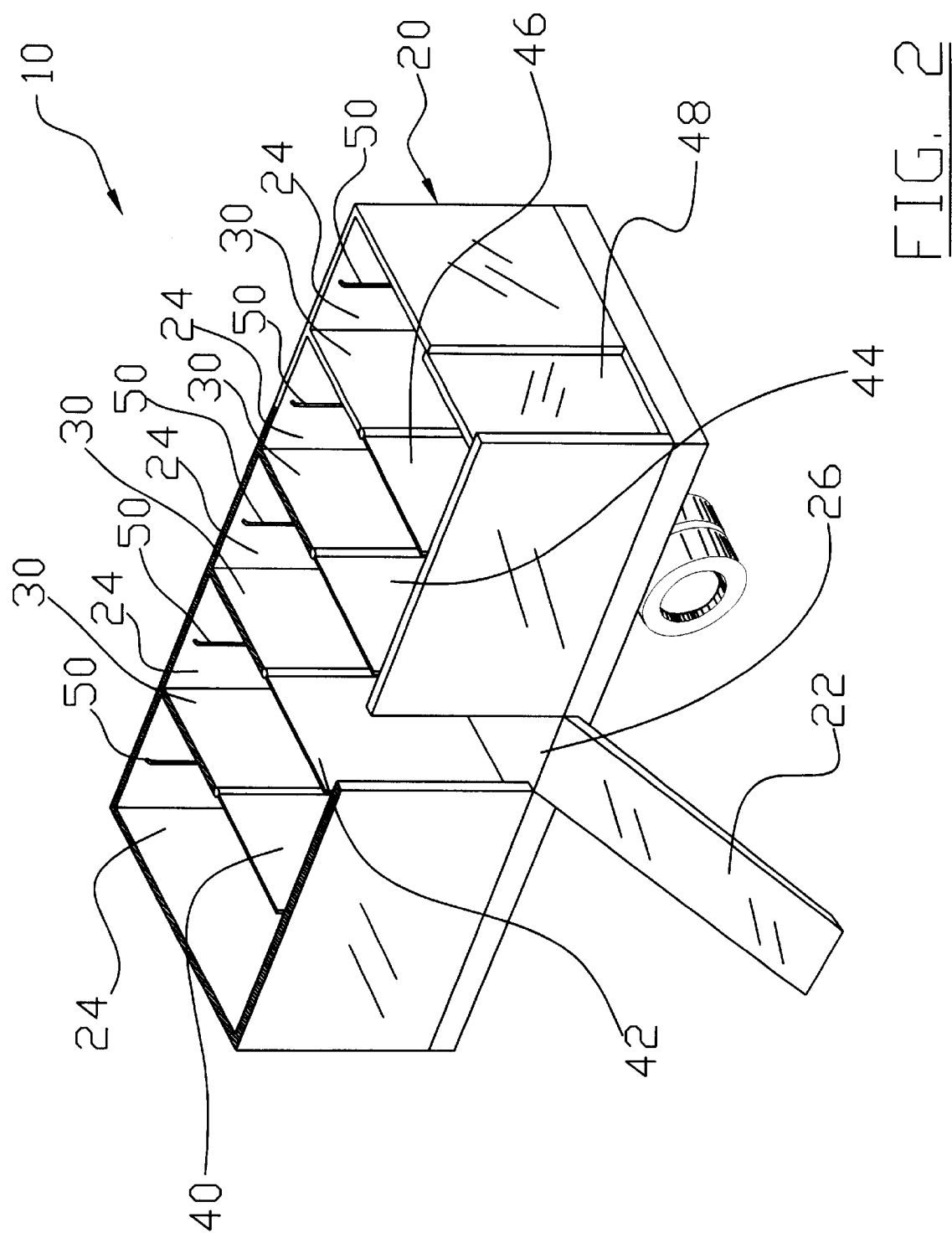
FIG. 2 is a rear upper perspective view of the present invention with the upper portion cutaway showing the interior of the frame.

As shown in FIGS. 1 and 2 of the drawings, a frame 20 is provided that is attached to a rear portion of the truck. The frame 20 is self-enclosed for retaining one or more animals 12 within. The frame 20 includes a plurality of walls that may be ventilated for the animals 12 within. The frame 20 may be comprised of any shape, size and structure capable of receiving and storing a plurality of animals 12 as can be appreciated.

As shown in FIG. 2 of the drawings, at least two openings, 26 and 28, are positioned within the frame 20 for allowing the entry and exiting of animals 12 from a heightened area such as a dock or more commonly used at ground level for exit or entry. A ramp 22 may also be utilized in conjunction with the opening 26 for allowing the entry and exiting of animals 12 from within the frame 20 through the opening 26. The ramp 22 may be pivotally attached to the frame 20 and manipulated utilizing an actuator device. The ramp 22 may be positioned for selectively closing the opening 26 within the frame 20. It can be appreciated that a conventional door may be utilized to selectively close the openings 26 and 28.

As further shown in FIGS. 2 through 9 of the drawings, a plurality of holding pens 24 are positioned within the frame 20 for holding a plurality of animals 12. A plurality of inner partitions 30 are positioned within the frame 20 for creating the plurality of separate holding pens 24 for the animals 12. The plurality of holding pens 24 are preferably aligned parallel to one another opposite of the opening 26 as shown in FIGS. 3 through 11 of the drawings. The partitions 30 may be comprised of various structures, heights and materials as can be appreciated.

In addition, a plurality of doors 40, 42, 44, 46 are positioned within the interior portion of the frame 20 for allowing guiding, grouping, positioning, and separating of the animals 12 within the interior portion of the frame 20. The doors 40, 42, 44, 46, 48 are preferably manipulated by actuator devices such as hydraulic cylinders or the like. Various configurations may be utilized to construct the holding pens 24 within the frame 20 of the animal transporting system 10 as can be appreciated by one skilled in the art.

The doors 40, 42, 44, 46 and the partitions 30 are arranged so that animals 12 positioned within will stay separated and guided to the desired locations or exit/entries. As shown in FIGS. 3 through 11 of the drawings, the plurality of doors 40, 42, 44, 46 and partitions 30 are preferably aligned parallel to one another. The plurality of partitions 30 preferably create a passageway that extends traversely to the partitions 30 and which is adjacent to the opening 26 as further shown in FIGS. 3 through 10 of the drawings.

As shown in FIGS. 3 through 11 of the drawings, a first door 40 is attached to a partition 30 near the front of the frame 20. A second door 42 and a third door 44 are attached to partitions 30 within the middle portion of the frame 20 as further shown in FIGS. 3 through 11 of the drawings. A fourth door 46 is attached to the partition 30 near the rear portion of the frame 20 opposite of the first door 40 as shown in FIGS. 3 through 10 of the drawings. In addition a fifth door 48 is at the rear of the frame 20 and when opened creates a rear opening 28 through which entry/exit can be gained.

At least one central control unit is utilized to control the actuators and/or cylinders utilized upon the animal transporting system 10. The control unit includes a plurality of switches commonly utilized to open and close hydraulic valves fluidly connected to the cylinders. The control unit may be programmed to execute specific sequences for manipulating the doors 40, 42, 44, 46, and 48. Since control units are commonly utilized within the agricultural industry, no further explanation is required.

Figure 14:
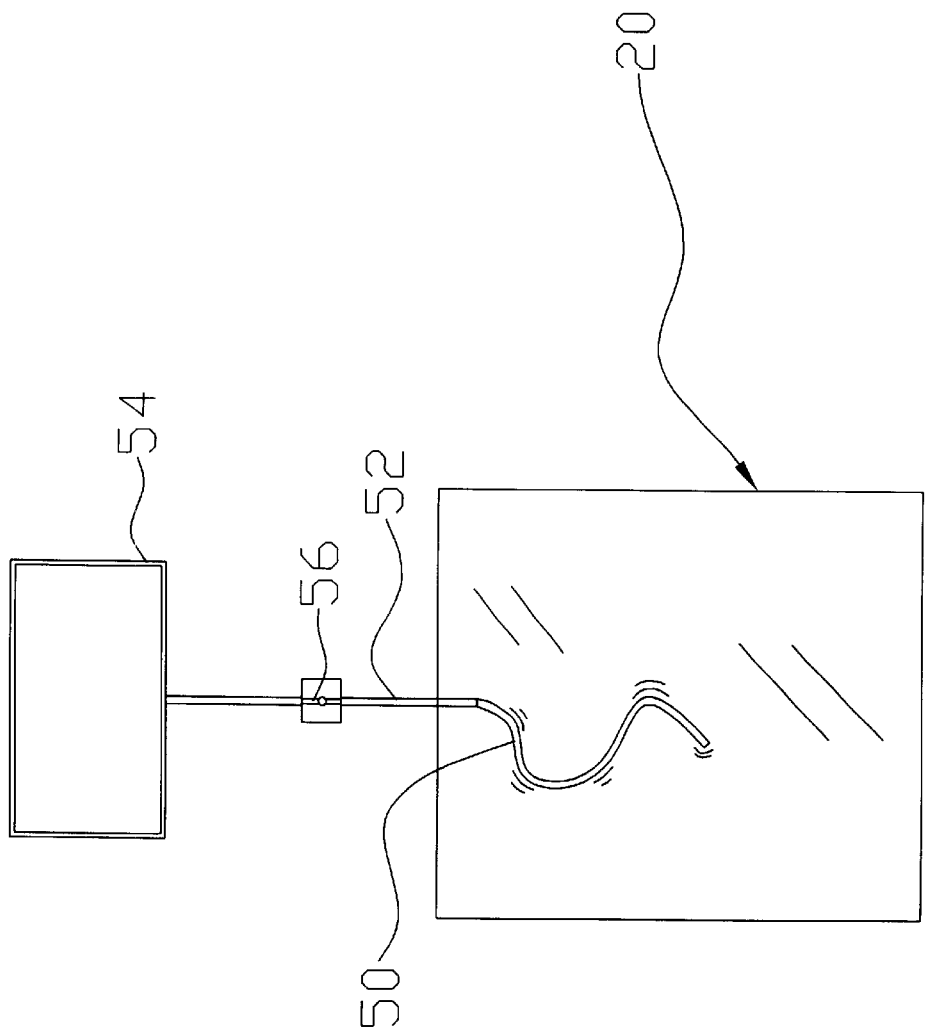
FIG. 14 is a front view of the flexible hose moving sporadically.
Figure 15:
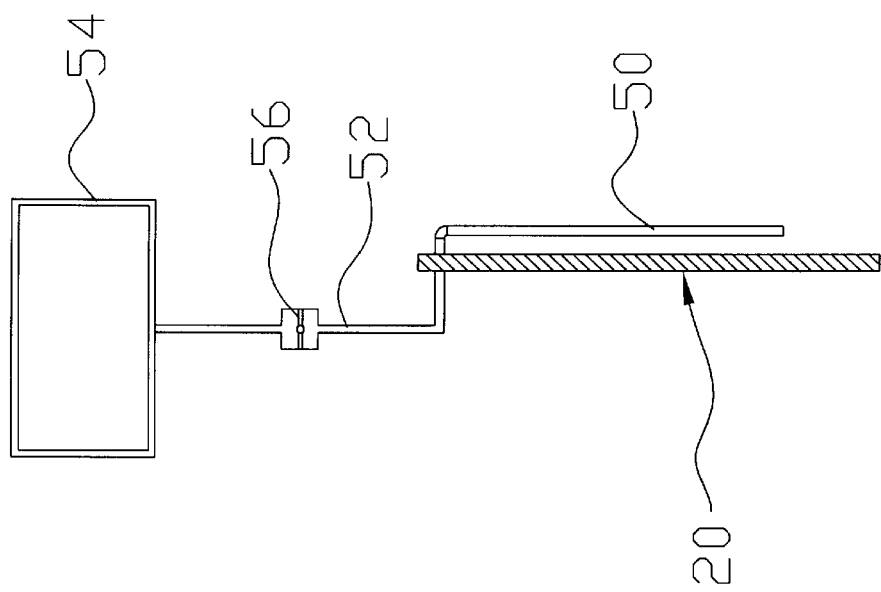
FIG. 15 is a side view of the air hose system.
Figure 16:
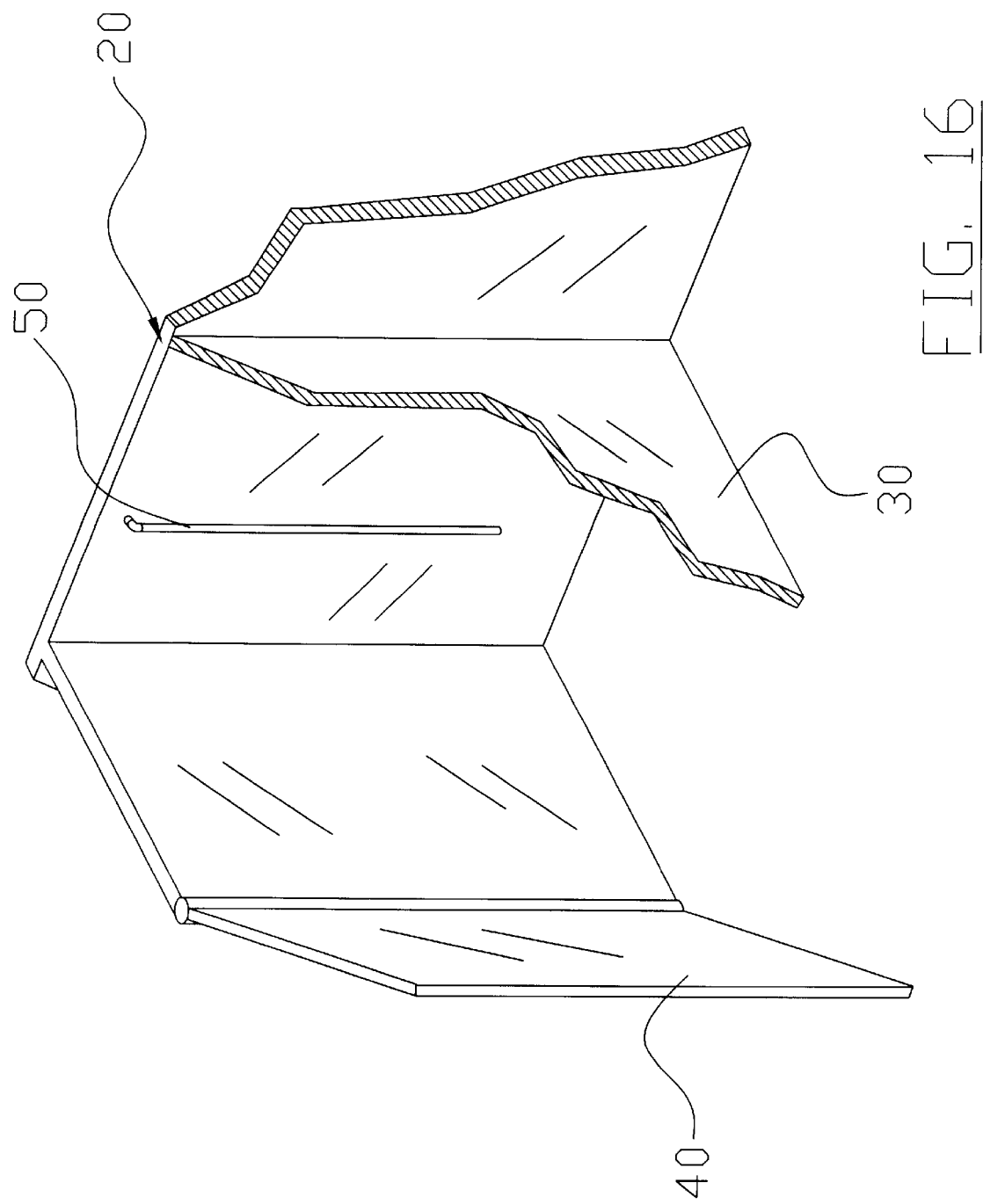
FIG. 16 is an upper perspective view of the air hose system.

As shown in FIGS. 12 through 16 of the drawings, a stimulator system is preferably positioned within each of the holding pens 24. The air hose system is comprised of an air tank 54 containing pressurized air, an airline 52 fluidly connected to the air tank 54, a valve 56 within the airline 52 controlled by the control unit, and a flexible hose 50 attached to the airline 52 opposite of the air tank 54. The flexible hose 50 extends through the outer wall of the frame 20 within the holding pen 24 as best shown in FIG. 15 of the drawings. When no air is being passed through the flexible hose 50, the flexible hose 50 simply extends downwardly adjacent the wall within the holding pen as best shown in FIG. 16 of the drawings. When the valve 56 is opened allowing the pressurized air within the air tank 54 to flow through the flexible hose 50, the flexible hose 50 moves about the holding pen 24 along with making a hissing sound from the air exiting the flexible hose 50 as shown in FIG. 14 of the drawings. The movement of the flexible hose 50 and the hissing sound encourages the animal 12 to exit the holding pen 24.

Figure 3:
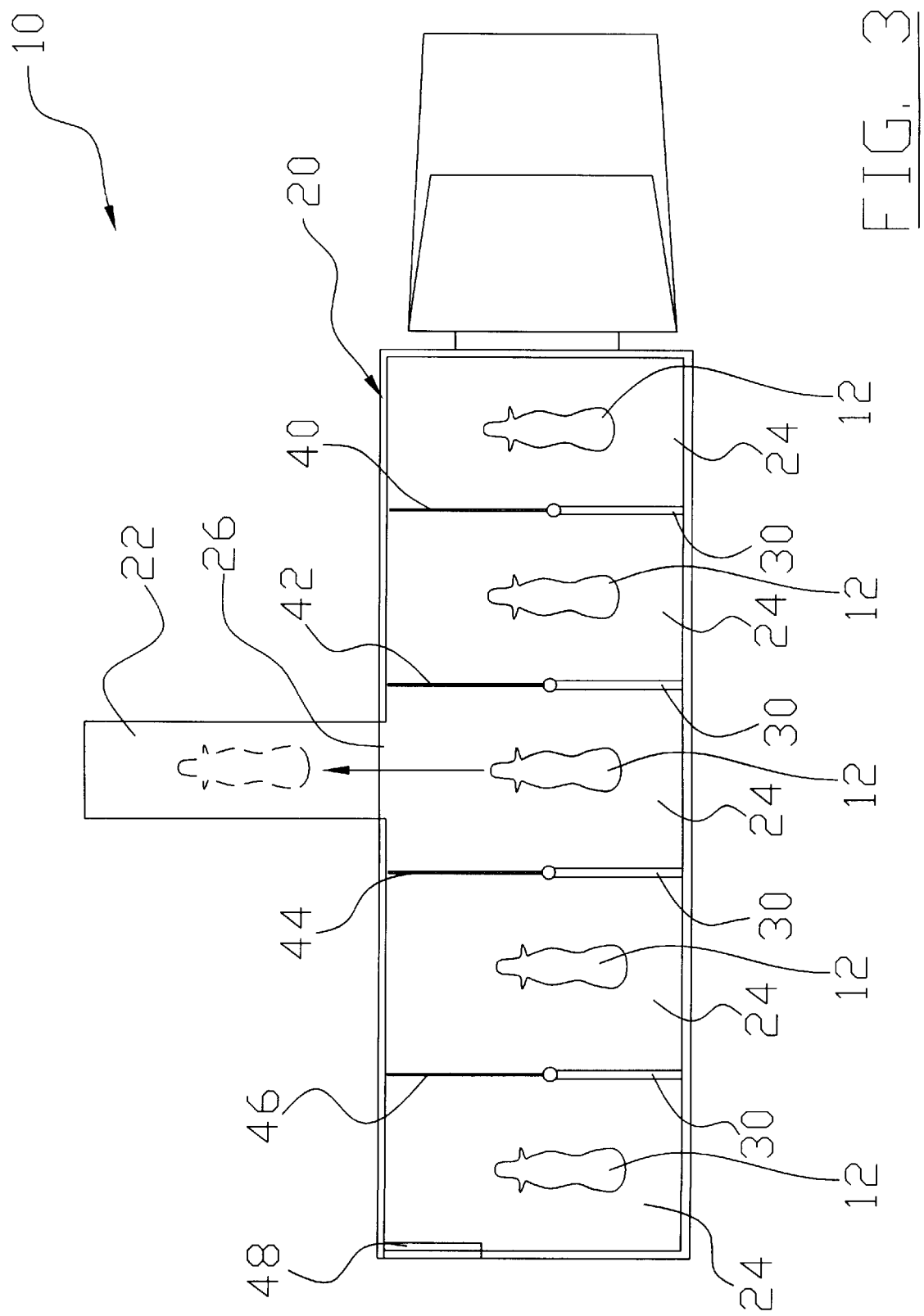
FIG. 3 is a top view of the present invention with all of the doors closed
Figure 4:
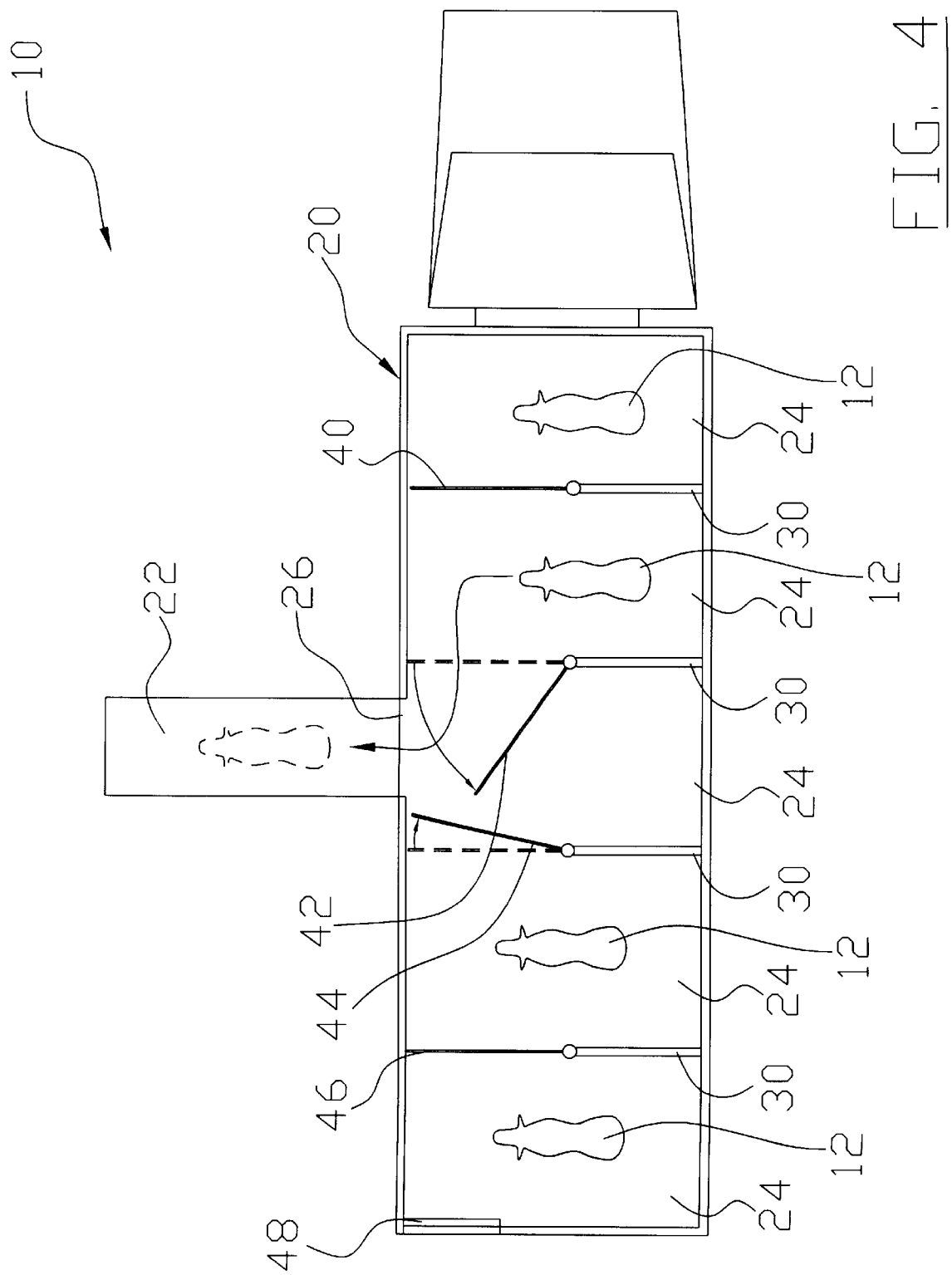
FIG. 4 is a top view of the present invention with the second door opened and the third door aligned inwardly.
Figure 5:
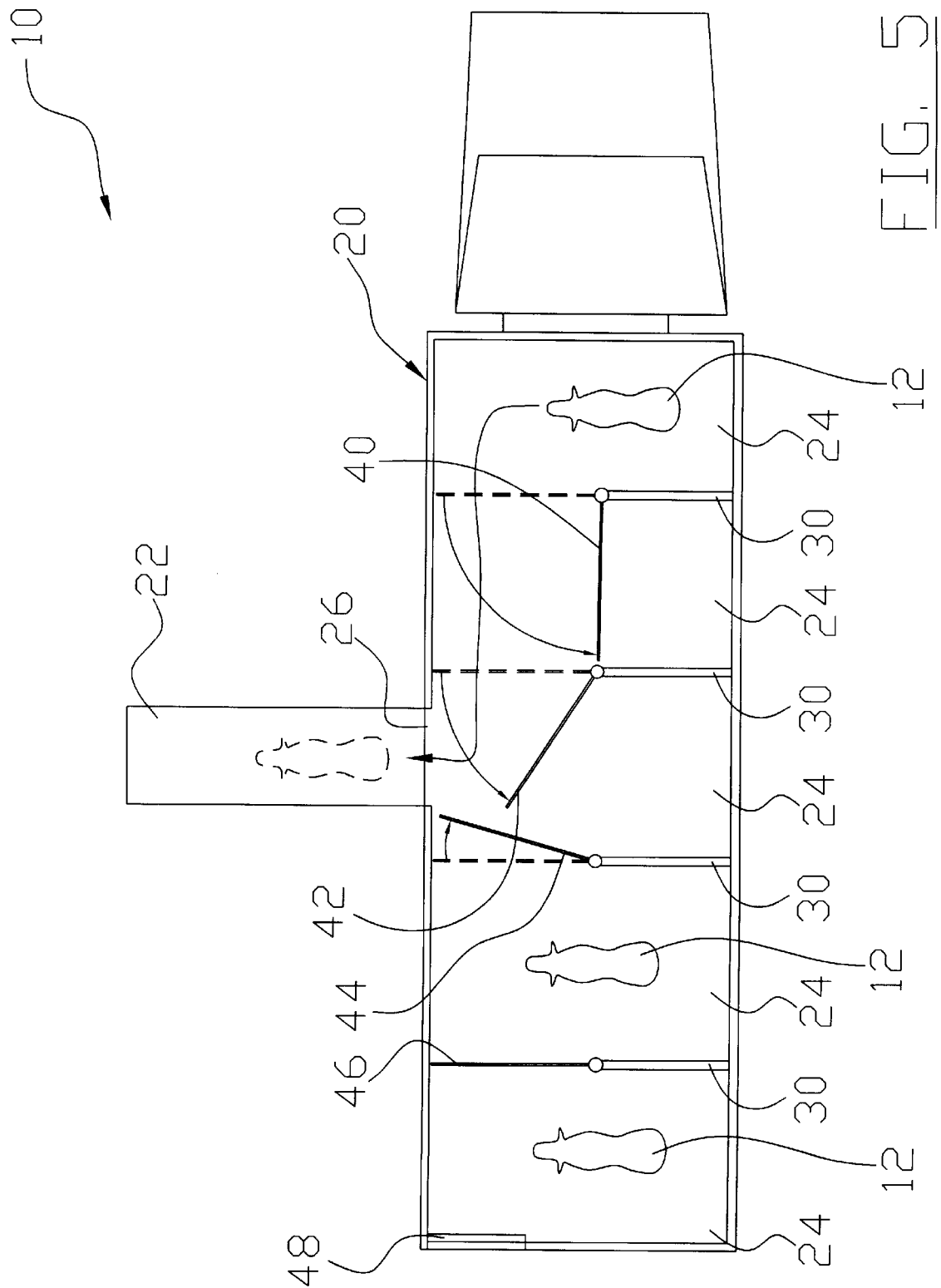
FIG. 5 is a top view of the present invention with the first and second doors opened and the third door aligned inwardly.
Figure 6:
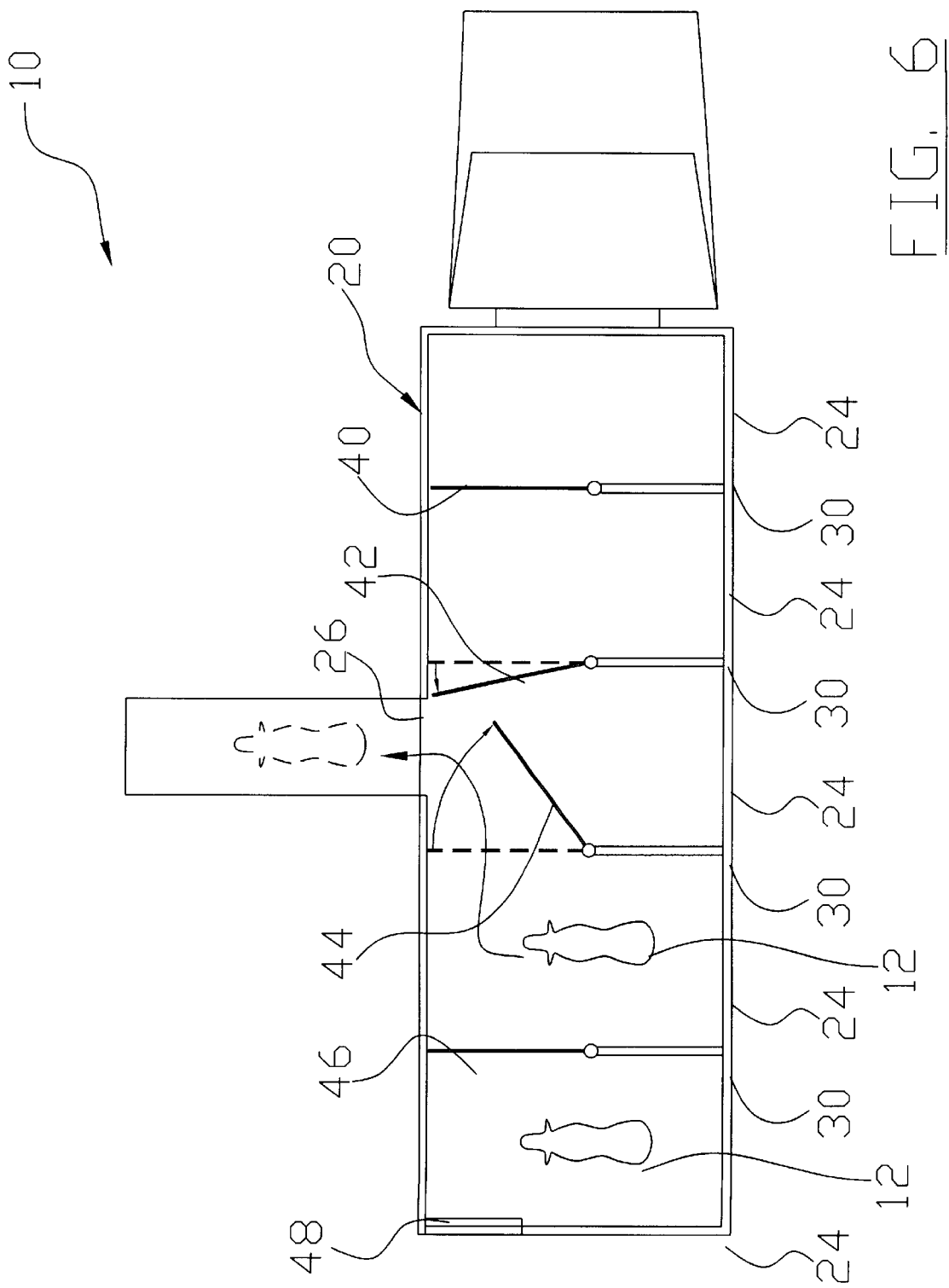
FIG. 6 is a top view of the present invention with the third door opened and the second door aligned inwardly.
Figure 7:
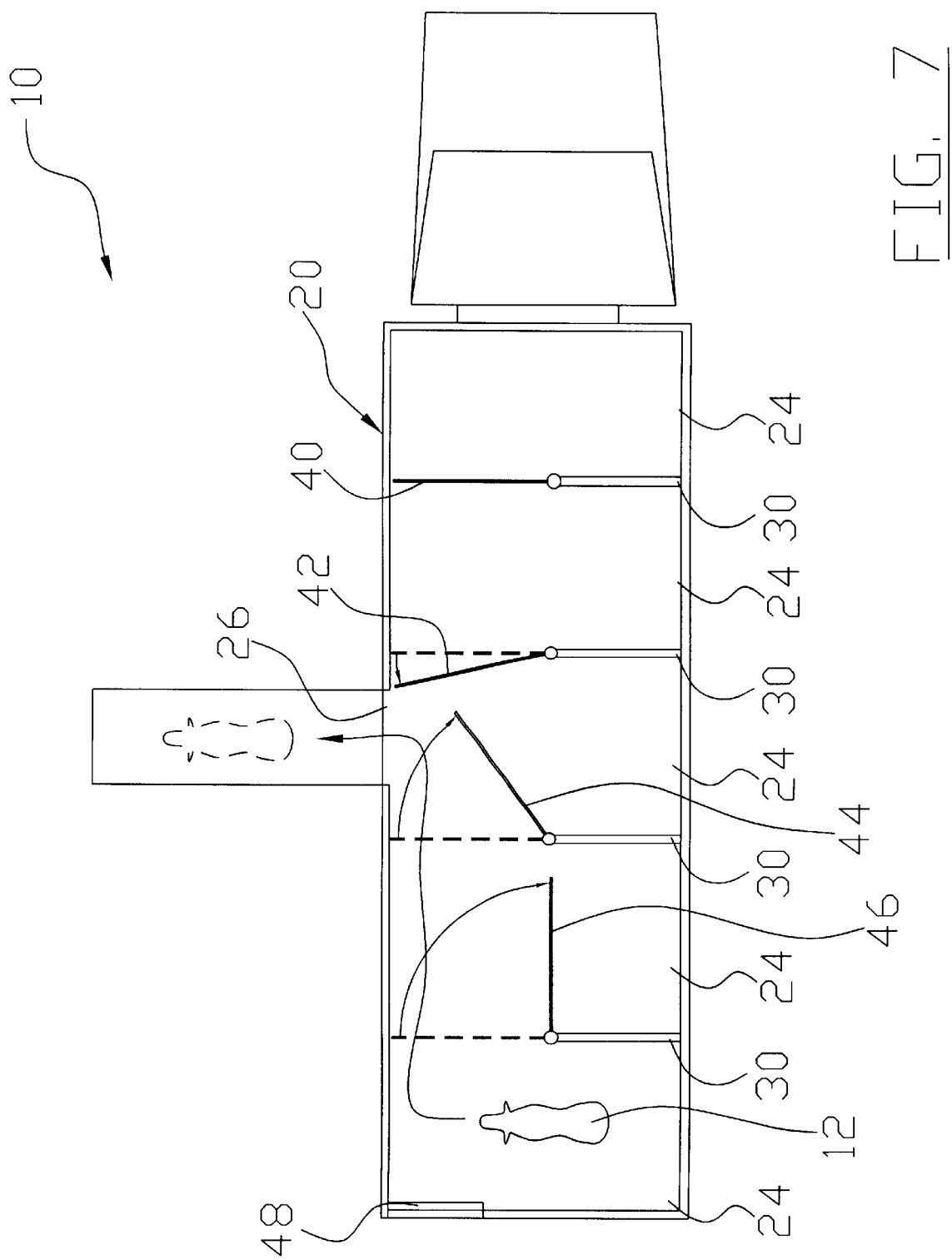
FIG. 7 is a top view of the present invention with the third and fourth doors opened and, the second door aligned inwardly.
Figure 8:
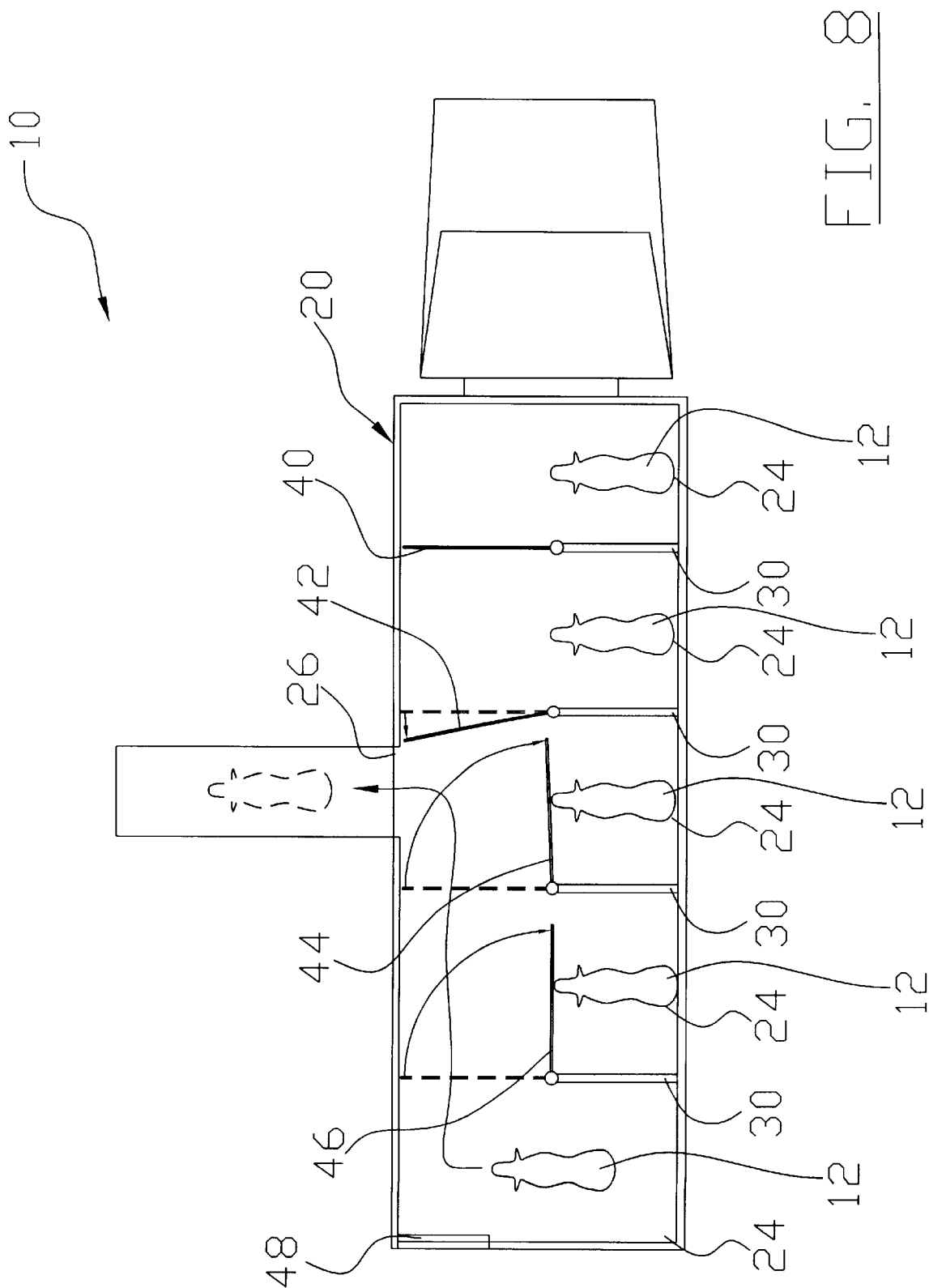
FIG. 8 is a top view of the present invention with the third and fourth doors fully opened, thus allowing the fifth animal to bypass the third and fourth animals in their respective compartments.
Figure 9:
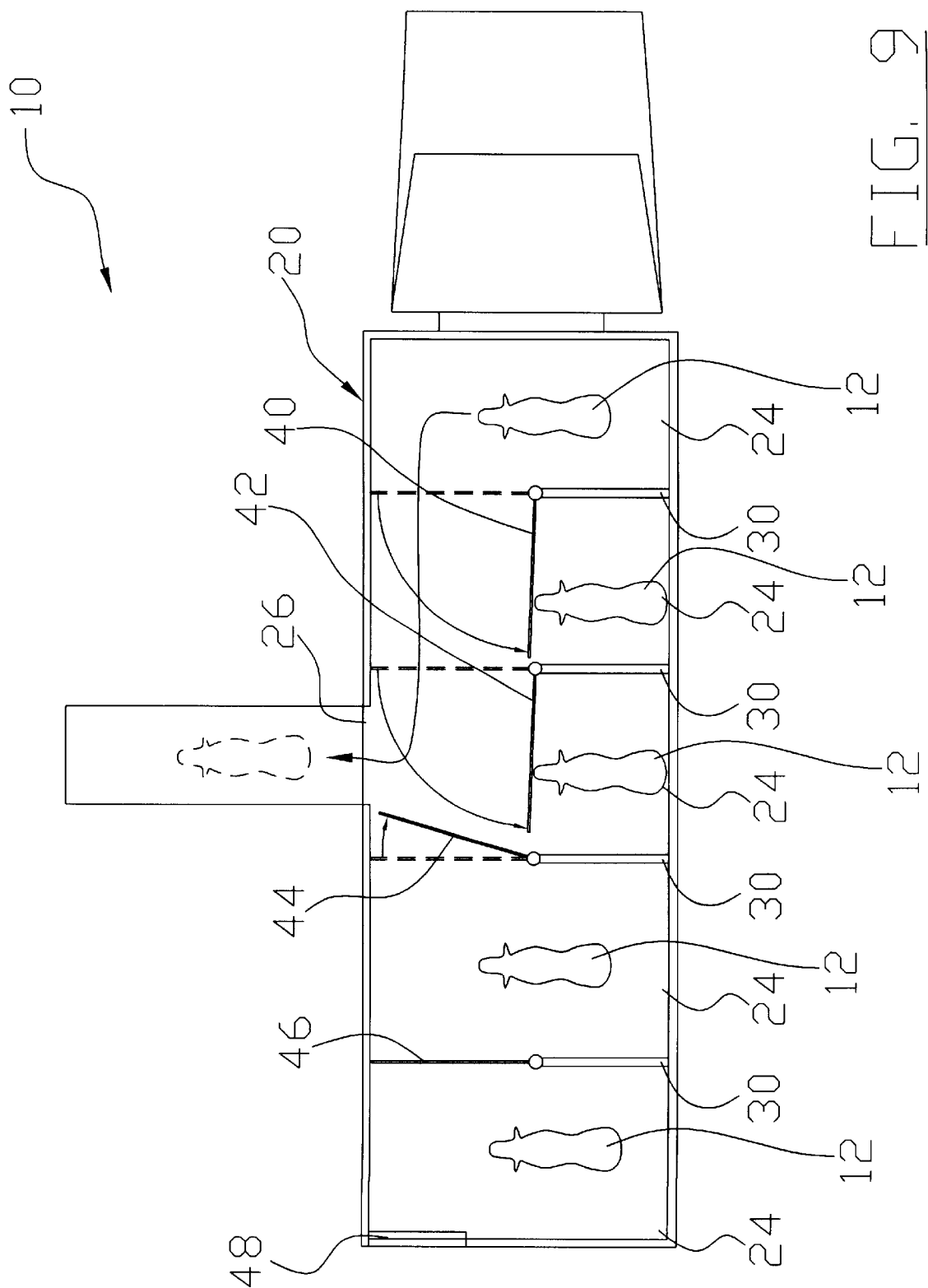
FIG. 9 is a top view of the present invention with the first and second doors fully opened, thus allowing the first animal to bypass the second and third animals in their respective compartments.
Figure 10:
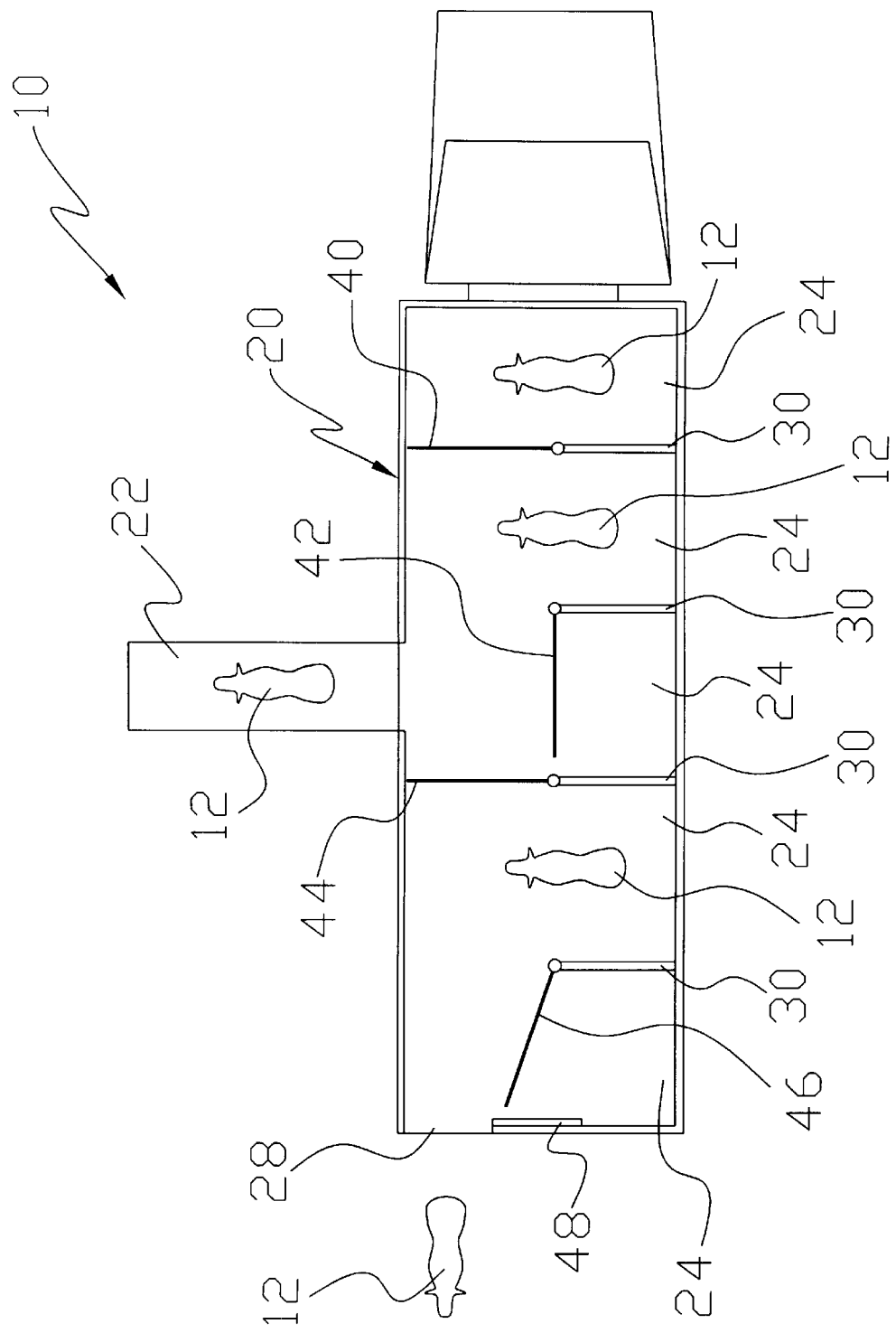
FIG. 10 is a top view of the present invention with the fifth/rear door opened.
Figure 11:
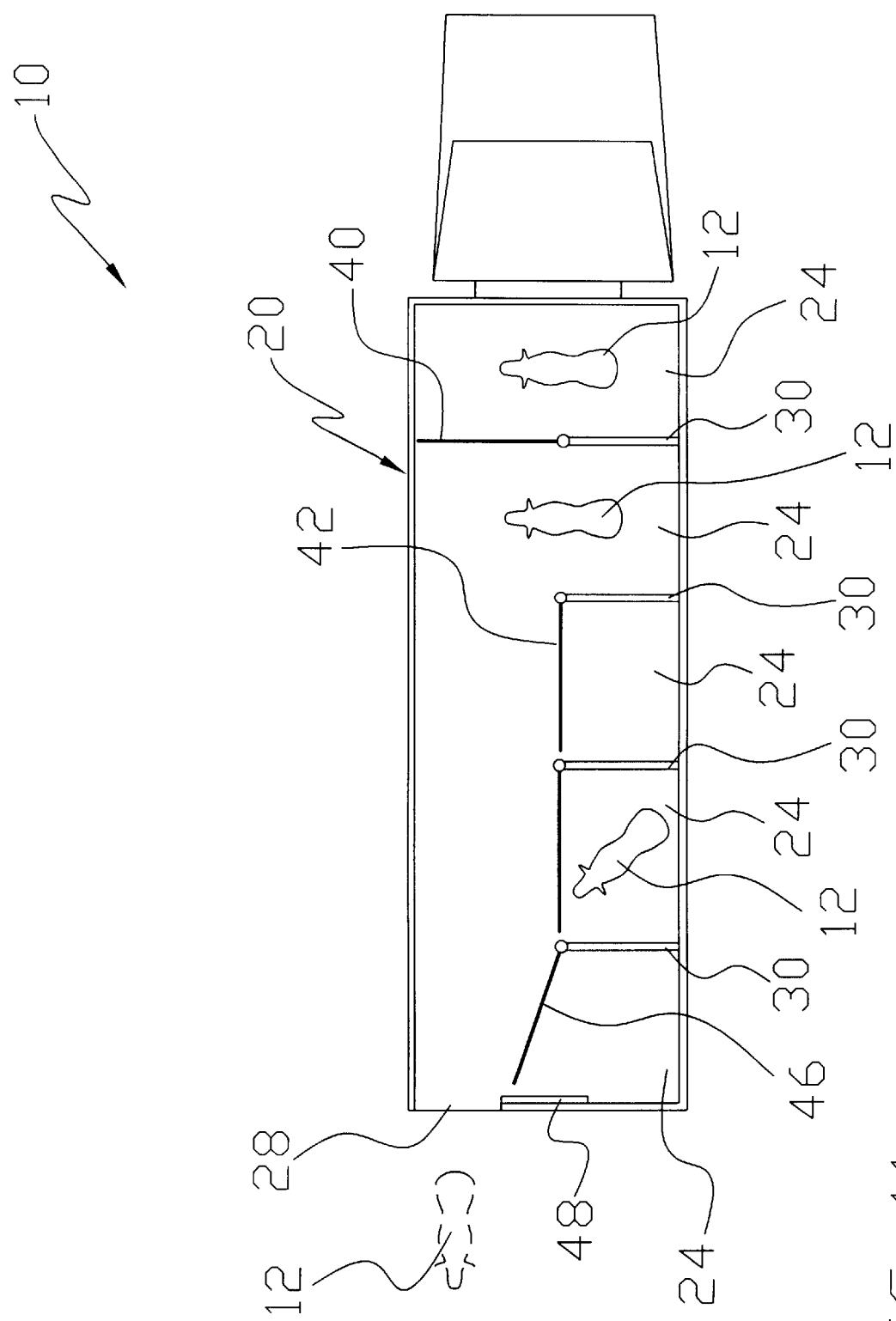
FIG. 11 is a top view of the present invention with the second, third, fourth and fifth doors opened and animal four being bypassed.
Figure 12:
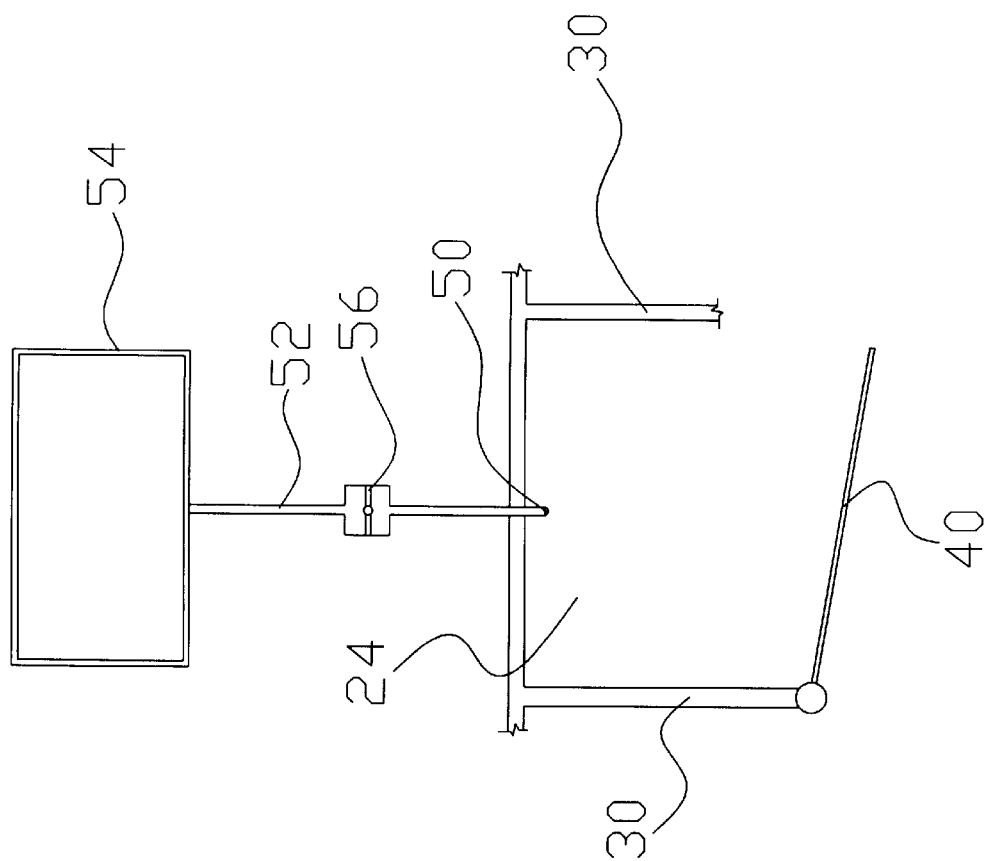
FIG. 12 is a top view illustrating the air hose system.
Figure 13:
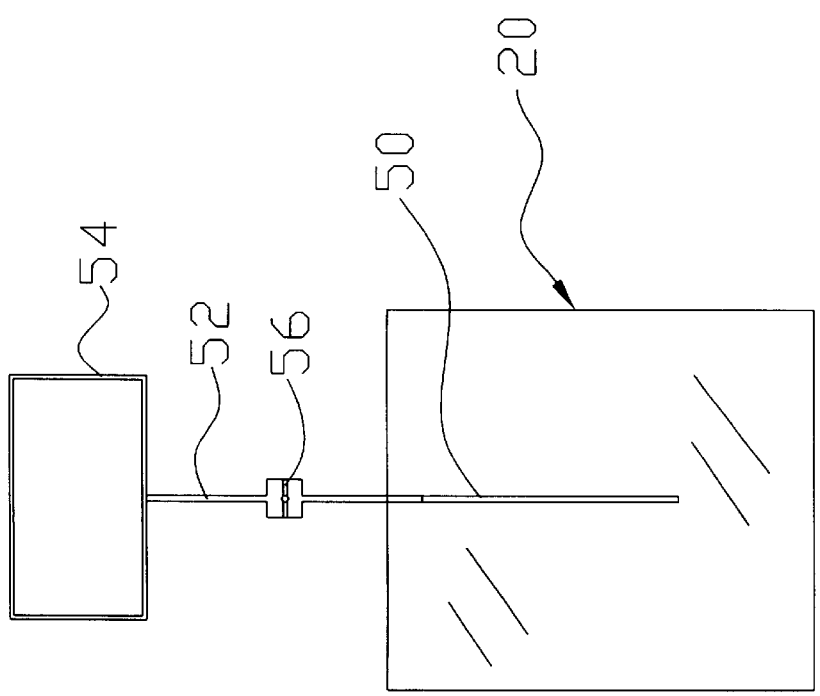
FIG. 13 is a front view of the air hose system.

In use, the user positions the side of the animal transporting system adjacent a feedlot pen or other animal holding area. The user then actuates the control unit during loading or unloading, the animals 12 are guided by the doors 40, 42, 44, 46, partitions 30, and frame of outer wall to the desired location depending upon the position of the doors 40, 42, 44, 46. The user actuates the control unit to facilitate the lowering of the ramp 22 thereby exposing the opening 26 within the frame 20. The animal 12 within the central holding pen 24 may then exit through the opening 26 as shown in FIG. 3 of the drawings. The air hose system may be actuated to encourage the animal to exit the holding pen 24. The user then actuates through the control unit to manipulate the third door 44 in a slightly angled positioned toward the opening 26 and the second door 42 into an open position for guiding the animal within the holding pen 24 second from the front to exit through the opening 26 as shown in FIG. 4 of the drawings. As shown in FIG. 5 of the drawings, the first door 40 is then fully opened to allow the exit of the animal 12 within the front holding pen 24. After the animals 12 within the front, second from the front and middle holding pens 24 have exited, the first door 40 is closed with the second door 42 slightly angled toward the opening 26 as shown in FIG. 6. As further shown in FIG. 6 of the drawings, the third door 44 is manipulated into an open position for allowing the exiting of the animal 12 within the holding pen 24 second from the rear. The user then manipulates the control panel to fully open the fourth door 46 so that the animal within the rear holding pen 24 may be released through the opening 26 as shown in FIG. 7 of the drawings. FIGS. 8 and 9 of the drawings illustrate additional initial sequences that may be utilize doors 40, 42, 44, 46 to bypass animals 12 from within the holding pens 24. To load the animals 12 within the holding pens 24, the above processes are utilized to load the animals 12 into the desired holding pens 24. It can be appreciated that various other sequences may be utilized to manipulate and control the doors 40, 42, 44, 46 to direct animals 12 to openings 26 and 28.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal transporting system for loading, sorting, transporting and unloading one or more animals, comprising:
    a frame having at least one outer wall and a floor;
    a plurality of partitions within said frame forming a plurality of holding pens within said frame for receiving a plurality of animals;
    a plurality of doors pivotally attached to said plurality of partitions;
    a means for opening each of said plurality of doors;
    a means within each of said plurality of holding pens for encouraging an animal to exit, wherein said means within each of said plurality of holding pens for encouraging an animal to exit is comprised of:
        a reservoir capable of storing a volume of pressurized air;
        an airline fluidly connected to said reservoir extending to one of said plurality of holding pens;
        a valve within said airline for selecting allowing a release of said pressurized air from within said reservoir; and
        a flexible hose having an open end fluidly connected to said airline opposite of said reservoir, wherein said flexible hose moves about within said holding pen when said pressurized air is released through said flexible hose;
    a plurality of openings within said frame for allowing said plurality of animals to enter and exit said frame; and
    a control unit for controlling said means for opening each of said plurality of doors and said means within each of said plurality of holding pens for encouraging an animal to exit.

2. The animal transporting system of claim 1, wherein said means for opening each of said plurality of doors is comprised of at least one actuator.

3. The animal transporting system of claim 2, wherein said at least one actuator is comprised of a hydraulic cylinder.

4. The animal transporting system of claim 1, wherein said plurality of partitions are positioned opposite of said plurality of openings.

5. The animal transporting system of claim 1, wherein said plurality of partitions are parallel to one another.

6. The animal transporting system of claim 1, wherein said plurality of doors extend from said plurality of partitions to adjacent an opposing wall within said frame.

7. The animal transporting system of claim 1, wherein said plurality of doors are comprised of a first door, a second door, a third door, a fourth door, and a fifth door.

8. The animal transporting system of claim 7, wherein said second door and third door define a middle holding pen that is aligned with said opening.

9. The animal transporting system of claim 1, wherein said plurality of doors are parallel to said partitions when in a closed position.

10. The animal transporting system of claim 1, wherein said plurality of doors are at an angle with respect to said plurality of partitions when in an open position.

11. The animal transporting system of claim 1, wherein said control unit is capable of opening and closing said plurality of doors within a specified sequence.

* * * * *